United States Patent [19]

Gvozdic

[11] Patent Number: 4,766,192
[45] Date of Patent: Aug. 23, 1988

[54] SILICONE POLYMER TERMINATION
[75] Inventor: Nedeljko V. Gvozdic, Bay City, Mich.
[73] Assignee: Dow Corning Corporation, Midland, Mich.
[21] Appl. No.: 72,192
[22] Filed: Jul. 10, 1987
[51] Int. Cl.$^4$ .............................................. C08G 77/06
[52] U.S. Cl. ...................................... 528/14; 528/37; 525/477
[58] Field of Search .................... 528/14, 37; 525/477
[56] References Cited

U.S. PATENT DOCUMENTS

| | | | |
|---|---|---|---|
| 2,739,952 | 3/1956 | Linville | 260/30.6 |
| 3,153,007 | 10/1964 | Boot | 260/46.5 |
| 4,250,290 | 2/1981 | Petersen | 528/14 |
| 4,341,888 | 7/1982 | Razzano | 528/37 |
| 4,439,592 | 3/1984 | Maass, et al. | 528/14 |
| 4,551,515 | 11/1985 | Herberg et al. | 528/37 |
| 4,625,011 | 11/1986 | Kosal et al. | 528/37 |
| 4,683,277 | 7/1987 | Maxson | 528/37 |

Primary Examiner—Melvyn I. Marquis
Attorney, Agent, or Firm—Edward C. Elliott

[57] ABSTRACT

Polydiorganosiloxane gum, of the type produced by the alkaline metal catalyzed polymerization of organocyclosiloxanes can be produced without hydroxyl content by mixing the gum with and acid or acid producing phosphoric component and a silylamide component, allowing the mixture to react until the hydroxyl groups are eliminated, then devolatilizing the gum. The hydroxyl content can be removed without causing any significant change in the molecular weight of the gum and producing a gum which is heat stable at temperatures such as 250° C. without the addition of heat stabilizers.

12 Claims, No Drawings

SILICONE POLYMER TERMINATION

BACKGROUND OF THE INVENTION

1. Field of the Invention

This invention relates to a method of terminating polydiorganosiloxane to eliminate hydroxy groups on silicon in the finished polymer.

2. Background Information

In the process of producing elastomers of polydiorganosiloxane, it becomes necessary to produce the high molecular weight polydiorganosiloxane used as the backbone of the elastomeric composition. The elastomeric composition comprises the polymer, a filler, and a curing system. The exact polymer that is used depends upon the desired physical properties of the final cured elastomeric composition, as well as the curing system chosen. In the instant case, the primary interest is in those polymers which are of a viscosity such that they are commonly referred to as "gums". These polymers are those usually combined with colloidal silica as a reinforcing agent and with organic peroxides as a curing system. The compositions are formed into shape by molding under pressure or by extrusion, then are cured by exposing to an elevated temperature. The cured elastomer has exceptional heat resistance as well as very acceptable physical properties.

A typical polydiorganosiloxane is ordinarily prepared by a batch process as follows: siloxane cyclic monomers, such as octamethylcyclotetrasiloxane, are charged to a polymerization vessel and dried by distillation or by treatment with drying agents. The monomer is then heated as to about 155° C. and sufficient polymerization catalyst, such as potassium hydroxide, is added to give a concentration of about 5 to 50 parts potassium per million parts of monomer. The polymerization proceeds until the polymer formed has the desired viscosity. The polymerization is stopped by the addition of a neutralizing agent such as an equal molar quantity of acidic material, such as phosphoric acid or carbon dioxide. The crude polymer is then stripped of unreacted monomer by distillation under vacuum. The polymers used in producing heat cured elastomers normally have a viscosity of greater than 1000 Pa.s at 25° C.

The above process is modified to give better control over the final viscosity of the polymer by adding end blocking units to the process during the polymerization process to control the polymer molecular weight. Commonly used end blocking materials are short chain siloxanes having $R_3SiO-$ ends, where R is hydrocarbon radical or hydroxyl radical or mixtures.

When it is desired to make polymers for use with reinforcing colloidal silica, it is often desirable to have as few hydroxyl groups present as possible. Any hydroxyl groups present react upon contact with the colloidal silica to form polymer-filler linkages which act the same as crosslinks, thus creating a higher viscosity, crosslinked mixture which does not flow easily under pressure. The resultant process is known as "creping". The creped material must be broken down by intensive shearing, as on a two roll mill, before it can be further processed. This is an expensive process, which also can effect the physical properties of the resultant cured elastomer. The endblocking materials are ordinarily triorgano endblocked so that the polymer has few hydroxy radicals present. Another method of attempting to prevent some of this problem is the use of "process aids" in the composition. A typical process aid is a low viscosity, hydroxyl endblocked polydiorganosiloxane. The thought is that the low viscosity material will preferentially react with the filler, thus preventing filler reaction with the high viscosity polymer.

In the polymerization process for making high molecular weight polymers, it is thought that hydroxyl groups are formed on a small number of the chain ends. The process of the instant invention is related to replacing these hydroxyl radicals with radicals which do not react with the filler.

Peterson, in U.S. Pat. No. 4,250,290, issued Feb. 10, 1981, teaches a process for the continuous manufacture of diorganopolysiloxane polymers. The process makes use of either water or a triorganosiloxy chainstopper to maintain the efficiency of the static mixer used in the process.

Maass et al, in U.S. Pat. No. 4,439,592, issued Mar. 27, 1984, describe a process for the preparation of triorganosilyl-terminated polydiorganosiloxanes by basic polymerization of cyclic diorganopolysiloxanes and triorganosilyl-terminated siloxanes. Before the polymerization is started, a part of the cyclic diorganosiloxane is distilled off in the presence of the polymerization catalyst to remove as much of the water present in the mixture as possible before the polymerization is started.

Herberg et al., in U.S. Pat. No. 4,551,515, issued Nov. 5, 1985, teaches a process for the continuous polymerization of polydiorganosiloxanes in which cyclopolysiloxane in mixed with one or more chainstopping agents, preheated, catalyzed, polymerized, and neutralized, using a screw extruder. They discuss drying the mixture of tetramer and chainstopping agent by passing through molecular sieves at the beginning of the process to remove water that will otherwise chainstop the polymer with silanol groups. They teach chainstopping agents may be any of those known in the art, such as vinyl chainstopper, trimethylsiloxy chainstopper, or silanol chainstopper.

None of the above processes or methods produces a polymer completely without any hydroxyl groups in the polymer. When only a triorganosilyl endblocked chainstopping agent is used, and the cyclic monomers are dried before use, a polymer can be produced with a minimum amount of hydroxyl group present, but that minimum amount is sufficient to cause a polymer to react with a colloidal silica filler to an extent sufficient to cause creping.

Additional means of producing polydiorganosiloxane having a lower silanol content may be found in U.S. patent application Ser. No. 923,468, filed Oct. 27, 1986, "Neutralization of Catalyst in Polymerization of Polydiorganosiloxane", now U.S. Pat. No. 4,719,276, by Leo Stebleton, owned by the same assignee as the instant application. This invention relates to a method of neutralizing the catalyst used in the alkaline polymerization of polydiorganosiloxane in which the neutralizing agent is a composition of the formula $R'_3SiOC(O)R''$, where R' is a hydrocarbon radical of from 1 to 6 carbon atoms inclusive and R" is a hydrocarbon radical of from 1 to 8 carbon atoms inclusive. Preferred is dimethylvinylsilylacetate.

Polydiorganosiloxane polymers are commonly produced by polymerization of cyclic materials using an alkaline catalyst. The catalyst is neutralized at the end of the polymerization process, with the resulting salt commonly remaining in the polymer in some small amount. When heated to high temperatures, the catalyst is activated and causes the polymer to be degraded. U.S. Pat. No. 2,739,952, issued Mar. 27, 1956, teaches the use of an organophosphorus compound free of silicon-bonded halogen in conjunction with such a polymer to prevent the polymer degradation upon heating. In U.S. Pat. No. 3,153,007, issued Oct. 13, 1964, it is commented that steam causes undesirable side effects during the devolatilization of gums such as are described in U.S. Pat. No. 2,739,952.

SUMMARY OF THE INVENTION

Polydiorganosiloxanes being free of hydroxyl groups on silicon, as well as being heat stable, can be produced by treating polydiorganosiloxane with an acidic or acid producing phosphoric component and a silylamide component. The components can be mixed and introduced into the polymer or can be introduced sequentially.

It is an object of this invention to produce a polydiorganosiloxane gum which is heat stable and which does not bind with fume silica to form a crepe upon aging.

DESCRIPTION OF THE INVENTION

This invention relates to a method of producing a polydiorganosiloxane free of hydroxyl groups comprising (A) heating 100 parts by weight of polydiorganosiloxane containing alkali metal to a temperature of from room temperature to 160° C., then (B) adding sufficient acidic or acid producing phosphoric component of the formula

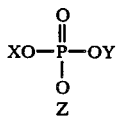

where X, Y, and Z are hydrogen or SiR$_3$ and R is a monovalent hydrocarbon radical or halogenated hydrocarbon radical having 1 to 6 carbon atoms, to give a mole ratio of alkali metal from the polydiorganosiloxane in (A) to the phosphorus in (B) of from 1:1 to 1:10, and from 0.2 to 1.0 parts by weight of silylamide component of the formula

where R is hydrogen, monovalent hydrocarbon radical or halogenated hydrocarbon radical having from 1 to 6 carbon atoms, and R' and R" are hydrogen, monovalent hydrocarbon radical having from 1 to 6 carbon atoms, or R$_3$Si- radical, and mixing with the exclusion of atmospheric moisture, then (C) holding at temperature for a sufficient time to allow the removal of the hydroxyl groups, then (D) devolatilizing to reduce the level of silylamide or volatile products to a level of less than 0.15 part by weight, to yield a polydiorganosiloxane having a slight change in viscosity and no hydroxyl groups on silicon.

A typical polydiorganosiloxane useful for the manufacture of silicone rubber is made in the manner described above in the background information. A common method of neutralizing the alkali metal catalyst used for polymerization is the addition of carbon dioxide to the mixture, which forms a salt with the catalyst and stops the polymerization process. Such a gum, when reinforced with fume silica, is a relatively heat stable material of commerce.

If such a gum is heated to an elevated temperature, such as 250° C., without some heat stability additive having been incorporated, the polymer is attacked by the catalyst and reverts back to lower molecular weight species, which volatilize from the material. The polymer will be completely evaporated in a matter of a few hours under such conditions.

Such a typical polydiorganosiloxane is endblocked with triorganosilyl groups, but a small number of the polymer chains are endblocked with hydroxyl groups. These groups can react with the fumed silica used for reinforcement to produce a stiff, unworkable mass, a process commonly known as "creping". The process of this invention reacts with the few remaining hydroxyl groups in the polymer in such a manner that they will no longer react with the fume silica.

The process of this invention can be carried out as a means of stopping the polymerization process and neutralizing the polymerization catalyst during polymerization of polydiorganosiloxane.

The amount of hydroxyl groups remaining in a gum may be estimated in relative terms by measuring the viscosity of the gum as produced, then crosslinking the gum through the hydroxyl groups and again measuring the viscosity. The relative increase in viscosity is a measure of whether there are hydroxyl groups present in the gum. An "activity number" is used to give an indication of the amount of hydroxyl groups present. In the instant case, an activity number of 0 is equivalent to 0 hydroxyl groups present. An activity of 30 is equivalent to about 30 percent of the chain ends being hydroxyl groups. An activity of 250 is equivalent to all of the chain ends being hydroxyl groups.

Polydiorganosiloxane gums are produced by the polymerization of low molecular weight cyclic species. In order to produce high molecular weights, it is necessary that the starting cyclic material be relatively pure, so the common starting ingredient is octaorganocyclotetrasiloxane of the formula

where R is a monovalent substituted or unsubstituted hydrocarbon radical. This cyclic material is polymerized by heating in the absence of moisture with a polymerization catalyst; for example, an alkaline metal compound such as potassium hydroxide in an amount of about 50 parts by weight per million parts by weight of cyclics. After the polymerization has reached the desired level, the catalyst is neutralized, and the mixture is stripped to remove unreacted low molecular weight materials, if desired.

The process of this invention can be followed to neutralize the catalyst after polymerization. After the desired degree of polymerization has taken place, the polymerization catalyst is neutralized by adding sufficient acidic or acid producing phosphoric component of the formula

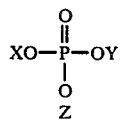

where X, Y, and Z are individually hydrogen or $SiR_3$, and R is a monovalent hydrocarbon radical or halogenated hydrocarbon radical having from 1 to 6 carbon atoms, to give a ratio of alkali metal, from the polydiorganosiloxane polymerization catalyst, to the phosphorous in the above phosphoric component to give a ratio of from 1:1 to 1:10. That is; there must be at least one phosphate for each alkali metal present in the polydiorganosiloxane. R in the above phosphoric component can be a monovalent hydrocarbon radical of from 1 to 6 carbon atoms such as an alkyl radical, such as methyl, ethyl, propyl, or hexyl; an alkenyl radical, such as vinyl or allyl; a halogenated hydrocarbon radical such as a halogenated alkyl, such as chloromethyl or 3,3,3-trifluoropropyl; or an aromatic radical, such as phenyl.

Examples of the phosphoric component are phosphoric acid and tris(trimethylsilyl)phosphate, with phosphoric acid preferred. When phosphoric acid is added as the phosphoric component, it is preferably added as an 85 percent concentration in water.

From 0.2 to 1.0 parts by weight of silylamide component of the formula

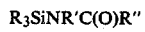

$R_3SiNR'C(O)R''$ where R is hydrogen, monovalent hydrocarbon radical or halogenated hydrocarbon radical having from 1 to 6 carbon atoms, and R' and R'' are hydrogen, monovalent hydrocarbon radical having from 1 to 6 carbon atoms, or $R_3Si$- radical, is added in the method of this invention.

R in the above silylamine component can be monovalent hydrocarbon radical of from 1 to 6 carbon atoms such as an alkyl radical, such as methyl, ethyl, propyl, or hexyl; an alkenyl radical, such as vinyl or allyl; a halogenated hydrocarbon radical such as a halogenated alkyl, such as chloromethyl or 3,3,3-trifluoropropyl; or an aromatic radical, such as phenyl.

R' and R'' in the above silylamine component can be monovalent hydrocarbon radical of from 1 to 6 carbon atoms such as an alkyl radical, such as methyl, ethyl, propyl, or hexyl; an alkenyl radical, such as allyl; or an aromatic radical, such as phenyl.

Silylamide is such as dimethylvinylsilyl(methyl)acetamide of the formula

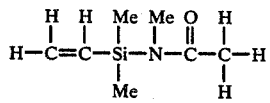

and trimethylsilyl(methyl)acetamide of the formula

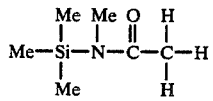

The preferred amount of silylamide is determined by the amount of hydroxyl radical present in the gum to be treated. It is necessary to have at least 1 mole of trialkylsilyl radical for each mole of hydroxyl radical. It is preferred that a larger amount of trialkylsilyl radical be present in case there is any other source of hydroxyl radical present during the treating process, for example, a leak in the mixer that allows moisture from the air to contact the gum during treatment. The hydroxyl content of the untreated gum can be estimated by running the activity test discussed above. A correlation can be established between the activity as given by the test and the amount of hydroxyl present in the gum. This estimated hydroxyl can then be used to determine the amount of silylamide to use. In practice the amount of silylamide used can vary at least from 1:1 to 1:10 as a ration of hydroxyl radical to trialkylsilyl radical.

The phosphoric component (B) and the silylamide (C) are added to the polydiorganosiloxane (A) in a container capable of heating to the desired temperature and capable of being sealed to allow mixing without contact with moisture in the atmosphere outside the mixer, as all moisture must be kept from the mixture so that the reactants react with the hydroxyl groups on the polydiorganosiloxane and not incidental hydroxyl groups allowed into the reaction mixture. The reaction will take place at room temperature if sufficient time is allowed, for instance, 4 hours. The reaction will take place in as little as 2 minutes or so if the reaction mixture is heated up to a temperature of 160° C.

After the reaction has proceeded to the desired point, the mixture is subjected to heat and vacuum to remove any volatile products and unreacted ingredients, and then cooled while under vacuum to give a polydiorganosiloxane having a slight change in viscosity and no hydroxyl groups on silicon.

The process of this invention can also be used to remove hydroxyl radicals in polydiorganosiloxane which has been neutralized after polymerization by conventional means, such as with carbon dioxide. In this case, the method comprises (A) heating 100 parts by weight of neutralized polydiorganosiloxane containing alkali metal to a temperature of from room temperature to 160° C., then (B) adding sufficient acidic or acid producing phosphoric component of the formula

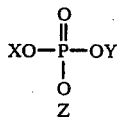

where X, Y, and Z are hydrogen or $SiR_3$, and R is a monovalent hydrocarbon radical or halogenated hydrocarbon radical having 1 to 6 carbon atoms, to give a ratio of alkali metal from the polydiorganosiloxane in (A) to the phosphorous in (B) of from 1:1 to 1:10, and from 0.2 to 1.0 parts by weight of silylamide component of the formula

$R_3SiNR'C(O)R''$ where R is hydrogen, monovalent hydrocarbon radical or halogenated hydrocarbon radical having from 1 to 6 carbon atoms, and R' and R'' are hydrogen, monovalent hydrocarbon radical having from 1 to 6 carbon atoms, or $R_3Si$- radical, and mixing with the exclusion of atmospheric moisture, then (C) holding at temperature for a sufficient time to allow the removal of the hydroxyl groups, then (D) devolatilizing to reduce the level of silylamide or volatile products to a level of less than 0.15 part by weight, to yield a polydiorganosiloxane having a slight change in viscosity and a no hydroxyl groups.

In this method of reducing hydroxyl active of gums which have already been neutralized with carbon dioxide, the order of addition of the phosphoric component and the silylamide component does not appear to make any difference in the result. The concentration of the phosphoric component does not have an effect upon whether the resulting gum will develop color upon heating.

The process of this invention gives a polydiorganosiloxane gum which does not crepe when mixed with reinforcing silica. The gum has an exceptional heat stability when heated in the presence of the oxygen in air. The gum produced by this invention can be used in place of the normally produced polydiorganosiloxane gums to give improved products over those previously available.

The following examples are included for illustrative purposes only and should not be construed as limiting the invention which is properly set forth in the appended claims. All parts are parts by weight.

EXAMPLE 1

A silicone polymer was prepared by first placing 2000 g of dimethylcyclotetrasiloxane, 2.0 g of dimethylvinyl endblocked dimethylsiloxane fluid having a degree of polymerization of from 1 to 7, and 3.3 g of methylvinylcyclotetrasiloxane in a dough mixer, sealing the mixer, and heating to 160° C. for 15 minutes while purging the mixer with dry nitrogen. Then sufficient potassium silanolate catalyst was added to give 25 parts of potassium per million parts of polymer. The polymerization reaction was carried out for 9 hours at temperature. During this reaction period a rubber septum sealing the mixer was removed, allowing moisture from the air to get into the mixer. Then the reaction was neutralized by injecting 0.15 ml of 85 percent phosphoric acid (41 ppm phosphorus) into the mixer, immediately followed by 4.4 ml of dimethylvinylsilyl(methyl)acetamide(0.2 weight percent). Samples of the gum were removed from the mixer 15 minutes and 30 minutes after addition of the neutralizing agents and the silylation reaction was quenched by washing the gum with distilled water, using a two roll mill. The samples were tested by an activity test to determine the degree of hydroxyl groups remaining in the polymer. The plasticity of the polymer and the weight loss were also measured.

The ratio of dimethylvinylsilyl group to hydroxyl group in the original gum prior to the addition of the silylating agent was about 1 to 1. The ratio of potassium to phosphorous was about 1 to 1.5.

The amount of hydroxyl groups remaining in a gum may be estimated in relative terms by measuring the viscosity of the gum as produced, then crosslinking the gum through the hydroxyl groups and again measuring the viscosity. The relative increase in viscosity is a measure of whether there are hydroxyl groups present in the gum. An "activity number" is used to give an indication of the amount of hydroxyl groups present. In the instant case, an activity number of 0 is equivalent to 0 hydroxyl groups present. An activity of 30 is equivalent to about 30 percent of the chain ends being hydroxyl groups. An activity of 250 is equivalent to all of the chain ends being hydroxyl groups.

The gum was evaluated by measuring the plasticity in accordance with ASTM D 926, the table showing the Williams plasticity number. The activity of the gum, a measure of the amount of hydroxyl groups left was measured in accordance with the procedure discussed above. The heat stability was measured by the weight loss at 250° C. in an air circulating oven after the indicated number of hours.

This gum is completely endblocked with dimethylvinylsilyl groups. During the polymerization process, the dimethylvinyl endblocked dimethylpolysiloxane fluid copolymerized with the dimethylcyclotetrasiloxane to give molecules with dimethylvinylsilyl endblocking, as well as a certain number of hydroxyl endblocked ends and silanolate ends (SiK ends). The treatment with dimethylvinylsilyl(methyl)acetamide replaced all of the hydroxyl endblocked ends and silanolate ends with dimethylvinylsilyl endblocking.

The properties of the gum are shown in Table I. The plasticity is lower than it would be expected due to the presence of moisture during polymerization.

TABLE I

| Neutralization time, minutes | 15 | 30 |
|---|---|---|
| Activity | 0 | 0 |
| Williams Plasticity Number | 109 | 109 |
| Weight Loss, percent | | |
| 0 hours | | 0 |
| 20 | | 2.5 |
| 32 | | 4.4 |
| 55 | | 5.9 |
| 78 | | 6.2 |

The gum was clear and developed no color upon heating.

EXAMPLE 2

The above example was repeated, except the order of addition of the dimethylvinylsilyl(methyl)acetamide and phosphoric acid was reversed. In this case the rubber septum on the mixer was not removed and the plasticity was at the expected level. The results are shown in Table II.

TABLE II

| Neutralization time, minutes | 15 | 30 |
|---|---|---|
| Activity | 0 | 0 |
| Williams Plasticity Number | 185 | 185 |
| Weight Loss, percent | | |
| 0 hours | | 0 |
| 6 | | 1.8 |
| 20 | | 3.3 |
| 50 | | 4.0 |
| 90 | | 6.7 |
| 100 | | 8.7 |

The gum was clear and developed no color upon heating.

EXAMPLE 3

A polydimethylsiloxane gum which had an activity of 28 was placed in a dough mixer and heated to 110° C. with dry nitrogen purge and mixing. Then 10 ml (0.5 weight percent) of dimethylvinylsilyl(methyl)acetamide was injected, immediately followed by 0.34 g (145 ppm phosphorous) of 85 percent phosphoric acid. The mixture was reacted for 3 hours at 110° C., after which the mixture was stripped at 165° C. for 30 minutes, cooled and tested as in example 1. The results are shown in Table III.

The properties of the original gum are shown for comparative purposes.

TABLE III

|  | Invention | Comparison |
| --- | --- | --- |
| Activity | 0 | 28 |
| Williams Plasticity Number | 160 | 160 |
| Weight Loss, percent |  |  |
| 0 hours | 0 | 0 |
| 17 | 3.2 | 92 |
| 24 | 4.0 | 100 |
| 42 | 5.2 | 100 |
| 48 | 5.7 | 100 |
| 62 | 6.3 | 100 |
| 200 | 9.5 | 100 |

EXAMPLE 4

A comparison was made between a method of treating a silicone gum using the method of this invention and a method using a combination of phosphoric acid and hexamethyldisilizane as the treating agent.

First, 2000 g of polydiorganosiloxane gum having about 0.14 mol percent vinyl radicals and the rest methyl radicals with dimethylvinylsiloxy endblockers was placed in a mixer at room temperature and purged with nitrogen, while mixing, for 15 minutes. Then 10 ml of dimethylvinyllsilylmethylacetamide was admixed, immediately followed by 0.34 g of 85 percent phosphoric acid. The ratio of potassium from the polymerization of the gum to the phosphorus from the phosphoric acid was calculated to be 1:1. The composition was mixed for 3 hours at 110° C. and stripped at 165° C. for 30 minutes. A sample of the treated gum was heated for 5 hours at 160° C. in a vacuum oven to test the stability.

A comparative sample was prepared by placing 6800 g of the same kind of gum into a mixer and purging with nitrogen. Then 0.5 ml of 85 percent phosphoric acid was admixed for 1 minute, then 30 ml of hexamethyldisilazane was added and mixed for 30 minutes, keeping a positive nitrogen pressure on the mixer contents, followed by applying a vacuum to the mixer contents and mixing under vacuum for 45 minutes to remove volatiles. The gum was sampled and tested at this point. The treated gum was further tested after 45 days at room temperature.

Each of the above gums was tested for activity after the various treatments with the results shown in Table IV.

TABLE IV

|  | Invention | Comparison |
| --- | --- | --- |
| Activity |  |  |
| Before treatment | 28 | 34 |
| As treated | 0 | 34 |
| After 45 days at room temperature | 0 | 0 |
| After 5 hours at 160° C. | 0 | 17 |
| Weight Loss, percent |  |  |
| 0 hours | 0 | 0 |
| 24 | 4 | 4 |
| 48 | 5.7 | 5.6 |

EXAMPLE 5

A comparative example was prepared which illustrates the difference in a gum produced according to this invention and a gum produced using trimethylsilylacetate treating agent.

First, 70 g of the gum of example 4 was placed into a sealed mixer preheated to 160° C. Then 0.3 g of trimethylsilylacetate was admixed for 10 minutes. The treated gum was removed from the mixer and stripped at 120° C. for 40 minutes. The gum was then sampled and tested as in example 4 with the results shown in Table V.

The gum of example 4 is shown again in Table V to compare with the comparative example.

TABLE V

|  | Invention | Comparison |
| --- | --- | --- |
| Activity |  |  |
| Before treatment | 28 | 39 |
| As treated | 0 | 36 |
| After 45 days at room temperature | 0 | — |
| After 5 hours at 160° C. | 0 | — |
| Weight Loss, percent |  |  |
| 0 hours | 0 | 0 |
| 24 | 4 | 4 |
| 48 | 5.7 | 10 |
| 200 | 9.5 | 80 |

EXAMPLE 6

A comparative example was prepared which illustrates the difference in a gum produced according to this invention and a gum produced using dimethylvinylsilyl(methyl)amide alone.

A sample was prepared identical to that of example 4, except no phosphoric acid was added. After treatment, the gum was sampled and tested as in example 4 with the results shown in Table VI.

The gum of example 4 is shown again in Table VI to compare with the comparative example.

TABLE VI

|  | Invention | Comparison |
| --- | --- | --- |
| Activity |  |  |
| Before treatment | 28 | 28 |
| As treated | 0 | 0 |
| After 5 hours at 160° C. | 0 | 0 |
| Weight Loss, percent, after stripping 30 min. at 160° C. |  |  |
| 0 hours | 0 | 0 |
| 10 | 9 | 81 |
| 24 | 9.5 | 100 |
| 100 | 15 | 100 |
| Weight Loss, percent unstripped |  |  |
| 0 | 0 | 0 |
| 10 | 2 | 100 |
| 24 | 3 | 100 |
| 100 | 9 | 100 |

EXAMPLE 7

A comparison of a silicone rubber made using a gum of this invention and one made using conventional gum illustrates an unexpected benefit of the gum of this invention.

A comparative stock was prepared by mixing 100 parts of polydiorganosiloxane gum having about 0.14 mol percent vinyl radicals and the rest methyl radicals with dimethylvinylsiloxy endblockers and a Williams Plasticity of about 150, 7.5 parts of hydroxyl endblocked polydimethylsiloxane fluid having a viscosity of about 0.04 Pa.s at 25° C. and about 4 weight percent silicon-bonded hydroxyl radicals, 20 parts of fume silica having a surface area of about 250 m²/g and 1.2 parts of catalyst paste of 50 percent 2,4-dichlorobenzoyl peroxide in polydiorganosiloxane fluid.

A similar stock was prepared, but using a gum prepared as in Example 1.

Each stock was then molded into test samples by pressing for 5 minutes at 116° C. into sheets and postcuring the sheets for 4 hours at 200° C. The sheets were then cut into test samples and tested with the results shown in Table VII.

The compression set of the stock using the gum of this invention is significantly lower than that of the stock using a conventional gum.

Similar comparisons made of stocks having other amounts of filler showed similar results.

TABLE VII

| Property Tested | This Invention | Comparative |
|---|---|---|
| Durometer, Shore A | 33 | 30 |
| Tensile Strength, MPa | 3.5 | 3.7 |
| Elongation, percent | 397 | 383 |
| Tear, Die B, kN/m | 5.1 | 4.9 |
| Compression Set, percent 22 hours/ 177° C. | 18.9 | 39.0 |

That which is claimed is:

1. A method of producing a polydiorganosiloxane free of hydroxyl groups comprising
   (A) heating 100 parts by weight of polydiorganosiloxane containing alkali metal to a temperature of from room temperature to 160° C., then
   (B) adding sufficient acidic or acid producing phosphoric component of the formula

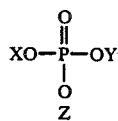

where X, Y, and Z are hydrogen or $SiR_3$, and R is a monovalent hydrocarbon radical or halogenated hydrocarbon radical having 1 to 6 carbon atoms, to give a mole ratio of alkali metal from the polydioganosiloxane in (A) to the phosphorous in (B) of from 1:1 to 1:10, and from 0.2 to 1.0 parts by weight of silylamide component of the formula

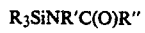

where R is hydrogen, monovalent hydrocarbon radical or halogenated hydrocarbon radical having from 1 to 6 carbon atoms, and R' and R" are hydrogen, monovalent hydrocarbon radical having from 1 to 6 carbon atoms, or $R_3Si$- radical, and mixing with the exclusion of atmospheric moisture, then
   (C) holding at temperature for a sufficient time to allow the removal of the hydroxyl groups, then
   (D) devolatilizing to reduce the level of silylamide or volatile products to a level of less than 0.15 part by weight, to yield a polydiorganosiloxane having a slight change in viscosity and no hydroxyl groups.

2. A method of producing a polydiorganosiloxane free of hydroxyl groups comprising
   (A) heating 100 parts by weight of diorganocyclosiloxane to a temperature of from room temperature to 160° C. in the presence of an alkaline polymerization catalyst for a time sufficient to polymerize to the desired molecular weight, to give a polydiorganosiloxane, then
   (B) adding sufficient acidic or acid producing phosphoric component of the formula

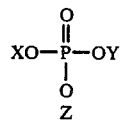

where X, Y, and Z are hydrogen of $SiR_3$, and R is a monovalent hydrocarbon radical or halogenated hydrocarbon radical having 1 to 6 carbon atoms, to give a mole ratio of alkali metal from the polydiorganosiloxane in (A) to the phosphorous in (B) of from 1:1 to 1:10, and from 0.2 to 1.0 parts by weight of silylamide component of the formula

wherein R is hydrogen, monovalent hydrocarbon radical or halogenated hydrocarbon radical having from 1 to 6 carbon atoms, and R' and R" are hydrogen, monovalent hydrocarbon radical having from 1 to 6 carbon atoms, or $R_3Si$- radical, and mixing with the exclusion of atmospheric moisture, then
   (C) holding at temperature for a sufficient time to allow the removal of the hydroxyl groups, then
   (D) devolatilizing to reduce the level of silylamide or volatile products to a level of less than 0.15 part by weight, to yield a polydiorganosiloxane having a slight change in viscosity and a reduced number of hydroxyl groups.

3. The method of claim 1 in which the mole ratio of alkali metal to phosphorus is between 1:1 and 1:2.

4. The method of claim 3 in which the alkali metal is potassium.

5. The method of claim 4 in which the trialkylsilylacetamide component is dimethylvinylsilyl(methyl)acetamide.

6. The method of claim 5 in which the phosphoric component is phosphoric acid.

7. The method of claim 2 in which the ratio of alkali metal to phosphorus is 1:1 to 1:4.

8. The method of claim 7 in which the alkali metal is potassium.

9. The method of claim 8 in which the trialkylsilylacetamide component is dimethylvinylsilyl(methyl)acetamide.

10. The method of claim 9 in which the phosphoric component is phosphoric acid.

11. The composition produced by the method of claim 1.

12. The composition produced by the method of claim 2.

* * * * *